United States Patent [19]

Matsunami et al.

[11] Patent Number: 4,536,010
[45] Date of Patent: Aug. 20, 1985

[54] AUTOMATIC SEATBELT SYSTEM

[75] Inventors: Muneharu Matsunami, Seto; Hiroshi Tsuge, Chiryu; Tatsushi Kubota, Okazaki; Hisashi Ogawa, Toyota, all of Japan

[73] Assignees: Toyota Jidosha Kogyo Kabushiki Kaisha; Kabushiki Kaisha Tokai-Rika-Denki-Seisakusho, both of Tokyo, Japan

[21] Appl. No.: 610,939

[22] Filed: May 17, 1984

Related U.S. Application Data

[63] Continuation of Ser. No. 357,910, Mar. 15, 1982, abandoned.

[30] Foreign Application Priority Data

Mar. 30, 1981 [JP] Japan ............................. 56-45045[U]

[51] Int. Cl.³ ............................................. B60R 21/10
[52] U.S. Cl. ...................................... 280/802; 297/481
[58] Field of Search ............... 280/801, 802, 807, 808; 297/481

[56] References Cited

U.S. PATENT DOCUMENTS

| | | | |
|---|---|---|---|
| 3,230,009 | 1/1966 | Schmidt et al. | 297/481 |
| 3,295,862 | 1/1967 | Ebert | 280/807 |
| 4,213,637 | 7/1980 | Mauron | 280/804 |
| 4,252,342 | 2/1981 | Terabayashi et al. | 280/803 |
| 4,258,933 | 3/1981 | Takada | 280/804 |
| 4,294,468 | 10/1981 | Kinaga et al. | 280/807 |
| 4,345,780 | 8/1982 | Moriya et al. | 280/808 |
| 4,349,217 | 9/1982 | Fohl | 280/808 |
| 4,365,827 | 12/1982 | Takada | 280/804 |
| 4,372,580 | 2/1983 | Motonami et al. | 280/807 |

FOREIGN PATENT DOCUMENTS

| | | | |
|---|---|---|---|
| 2161384 | 6/1973 | Fed. Rep. of Germany | 280/804 |
| 2748137 | 5/1979 | Fed. Rep. of Germany | 280/802 |
| 1384386 | 2/1975 | United Kingdom | 280/801 |

*Primary Examiner*—Joseph F. Peters, Jr.
*Assistant Examiner*—Ross Weaver
*Attorney, Agent, or Firm*—Parkhurst & Oliff

[57] ABSTRACT

An automatic system for use in a motor vehicle has an outer webbing, both ends of which are secured to a vehicle door and an inner webbing, one end of which is connected to the intermediate portion of the outer webbing through a ring joint movable along the outer webbing and the other end of which is retracted by a retractor on a vehicle floor. A guide lever is provided at an inner side of an occupant's seat, which includes a main body fixed to the inner side of the seat and a webbing guide portion on the top of the main body. The webbing guide portion has an opening through which the inner webbing passes and is rotatable around an axis extending laterally of the vehicle, whereby the webbing guide portion presents a suitable position and angle to guide the inner webbing at any condition, for example, with or without an occupant on the seat.

6 Claims, 10 Drawing Figures

AUTOMATIC SEATBELT SYSTEM

This is a continuation of application Ser. No. 357,910 filed Mar. 15, 1982, now abandoned.

BACKGROUND OF THE INVENTION

1. Field of the Invention

This invention relates to an automatic seatbelt system for use in a motor vehicle, and more particularly to an improvement in the automatic seatbelt system for automatically fastening occupant restraining webbings about an occupant in the vehicle.

2. Description of the Prior Art

A seatbelt system has been adapted to restrain and protect an occupant in the event of an emergency situation such as a collision. However, the inconvenience or unease in fastening a seatbelt webbing often prevents the occupant from fastening the webbing willingly. To overcome this problem, there has been proposed an automatic seatbelt system capable of automatically fastening an occupant fastening webbing about the occupant upon his entering the vehicle.

Among the automatic seatbelt systems of the type described, one in which the webbing extends from a vehicle door to substantially the central portion of the vehicle via a position close to an occupant's seat is inexpensive and reliably operable and, hence, highly evaluated. In this automatic seatbelt system, as shown in FIGS. 1 through 3, one end portion of an occupant restraining inner webbing 1 is wound into a retractor 2, which is secured to a tunnel portion 4 projecting from substantially the central portion of a vehicle body 3. This retractor 2 winds the inner webbing 1 by its biasing force, and incorporates therein an inertia lock mechanism, not shown, for abruptly stopping the unwinding of the inner webbing 1 in the event of a vehicular emergency situation. The other end portion of this inner webbing 1 is passed through an opening 5a of a ring joint 5, then turned back therearound and sewn onto the webbing itself. The intermediate portion of an occupant restraining outer webbing 6 is inserted through the opening 5a of the ring joint 5, made movable in the longitudinal direction of the webbing. One end of the outer webbing 6 is engaged with the lower rear end portion of a vehicle door 8 through an anchor plate 7, and the other end thereof is secured thereto with a tongue plate 9. This tongue plate 9 is engaged with a buckle device 20 solidly secured to the upper rear end of the vehicle door 8, whereby both ends of the outer webbing 6 are engaged with the door. This buckle device 10 is provided with a release knob 11, and, when the occupant presses this release knob 11, the tongue plate 9 can be released from the buckle device 10. The inner webbing 1 and outer webbing 6 are interposed between the vehicle body 3 and the vehicle door 8 as described above, so that the webbings 1 and 6 can be automatically fastened about an occupant 13 seated on a seat 12 in accordance with the opening or closing of the door 8.

However, in the automatic seatbelt system of the type described, the outer webbing 6 is divided into two portions including a shoulder restraining belt and a lap restraining belt, bordering each other at a ring joint 5. Since the ring joint 5 is movable along the outer webbing 6, namely the shoulder and lap belt, a tension generated in the outer webbing 6 due to the forward movement of the occupant in the event of a collision generates a phenomenon in which the lap restraining belt is passed through the ring joint 5 and moved to the shoulder restraining portion. Or, the ring joint 5 may be raised upward without moving along the outer webbing.

In view of the phenomenon as described above, there has been proposed an automatic seatbelt system as shown in FIG. 4 where a guide lever 14 is fixedly provided at the inner side of the occupant's seat, and the substantially intermediate portion of the inner webbing 1 is passed through a slot or opening defined by a guide loop portion 15a formed at a webbing guide portion 15 of the guide lever 14.

With the above-described arrangement, the aforesaid phenomenon can be obviated by preventing the inner webbing from being raised upward. However, the webbing guide portion 15 of the guide lever 14 is fixed to a main body 16 of the guide lever, thus presenting the disadvantages to be described hereunder. Namely, for example, if the inclination angle of the webbing guide portion 15 is such that the inner webbing 1 can be freely passed therethrough when the occupant 13 is not seated on the seat 12, then the inner webbing 1 comes into pressing contact with the upper end of the guide loop portion 15a of the webbing guide portion 15 when the occupant 13 is seated on the seat 12, with the result that a so-called offset portion occurs in the inner webbing 1, thus necessitating a larger force to open or close the door and also causing a partial wear, and the like in the inner webbing 1. On the other hand, if the inclination angle of the webbing guide portion 15 is in such that the inner webbing 1 can be freely passed therethrough when the occupant 13 is seated on the seat 12, then the inner webbing 1 comes into abutting contact with the lower end of the guide loop portion 15a when the occupant 13 is not seated on the seat 12, thus presenting the disadvantage that the so-called offset portion occurs in the inner webbing 1. The offset portion also occurs depending on the adjustment of a seat position, physical build of the occupant and so forth where the webbing guide portion is in a fixed placement.

SUMMARY OF THE INVENTION

The present invention has been developed to obviate the above-described disadvantages of the prior art and has as its object the provision of an automatic seatbelt system wherein the webbings are always suitably guided in accordance with any situation, for example, presence or absence of the occupant on the seat, any physical build (large or small) of the occupant, varied types of the seat and the like, and the so-called offset of the webbing in the webbing guide portion can be positively prevented, thereby reliably obviating the disadvantages of the larger door opening force, the partial wear, breakage or the like of the webbing.

The above-described object can be achieved by the present invention with such an arrangement that a seatbelt webbing extends substantially from a vehicle door to a central portion of a vehicle floor via a position close to an occupant's seat and a guide lever is provided to guide the webbing at the position close to the seat. The guide lever includes a webbing guide portion with an opening through which the webbing passes and the webbing guide portion is rotatable around an axis extending in a lateral direction of the vehicle to present an accorded guidance to the webbing in response to the movement of the webbing. The guide lever may include a spring member to bias the webbing guide portion toward a position where the webbing extends close to the seat.

DESCRIPTION OF THE PREFERRED EMBODIMENTS

Figure 1:
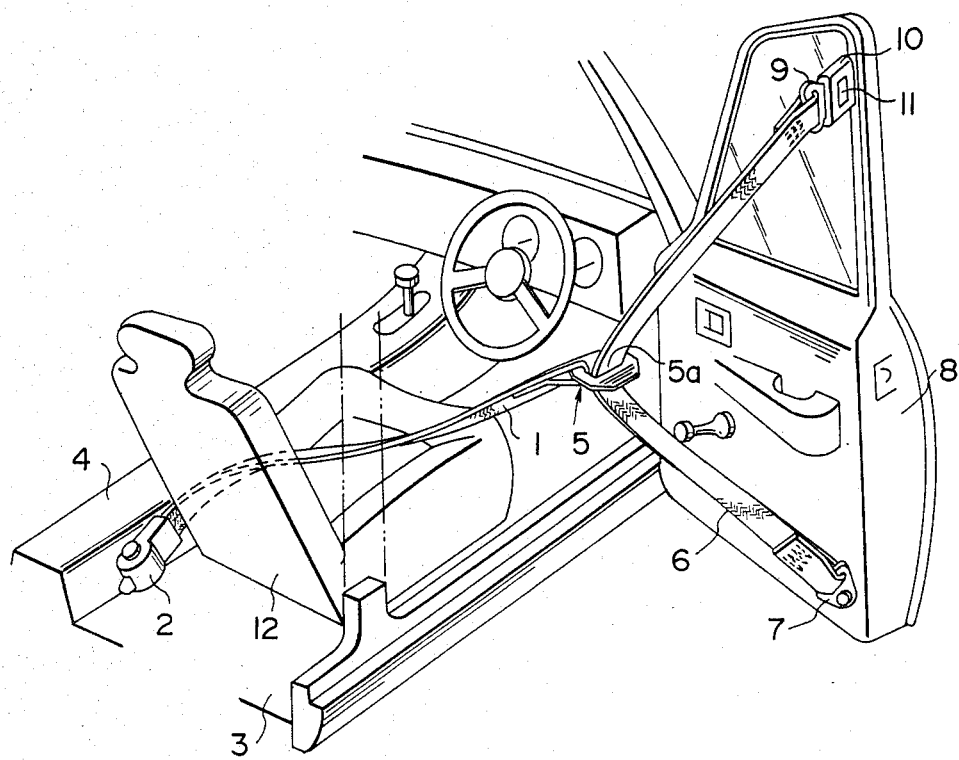
FIG. 1 is a perspective view showing a conventional automatic seatbelt system.
Figure 2:
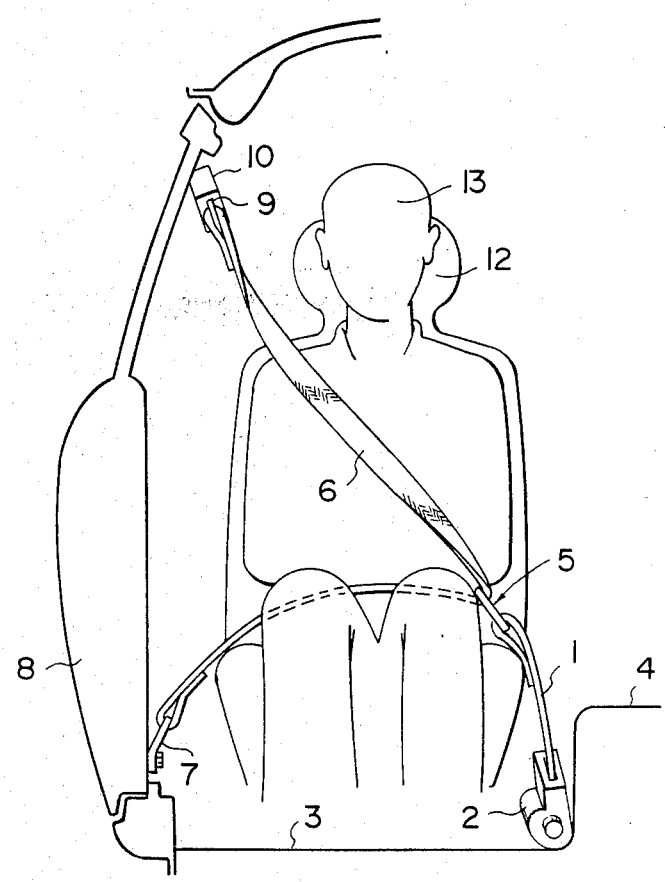
FIG. 2 is a front view of the seatbelt system in FIG. 1.
Figure 3:
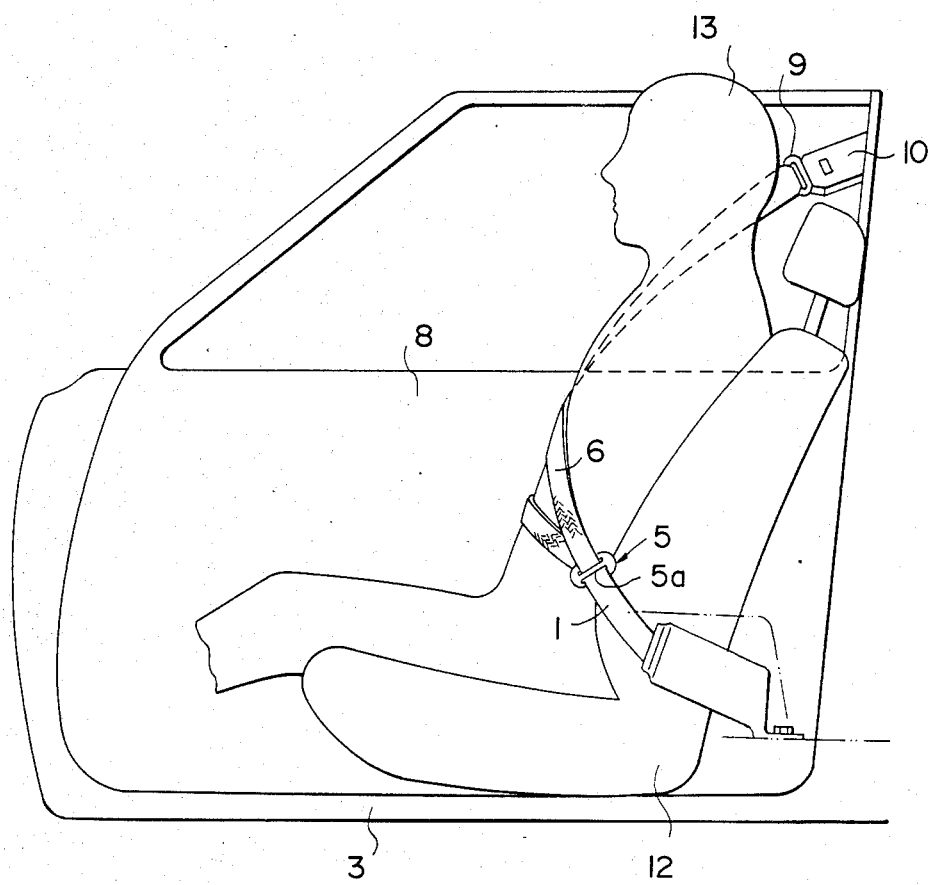
FIG. 3 is a side view of the seatbelt system in FIG. 1.
Figure 4:
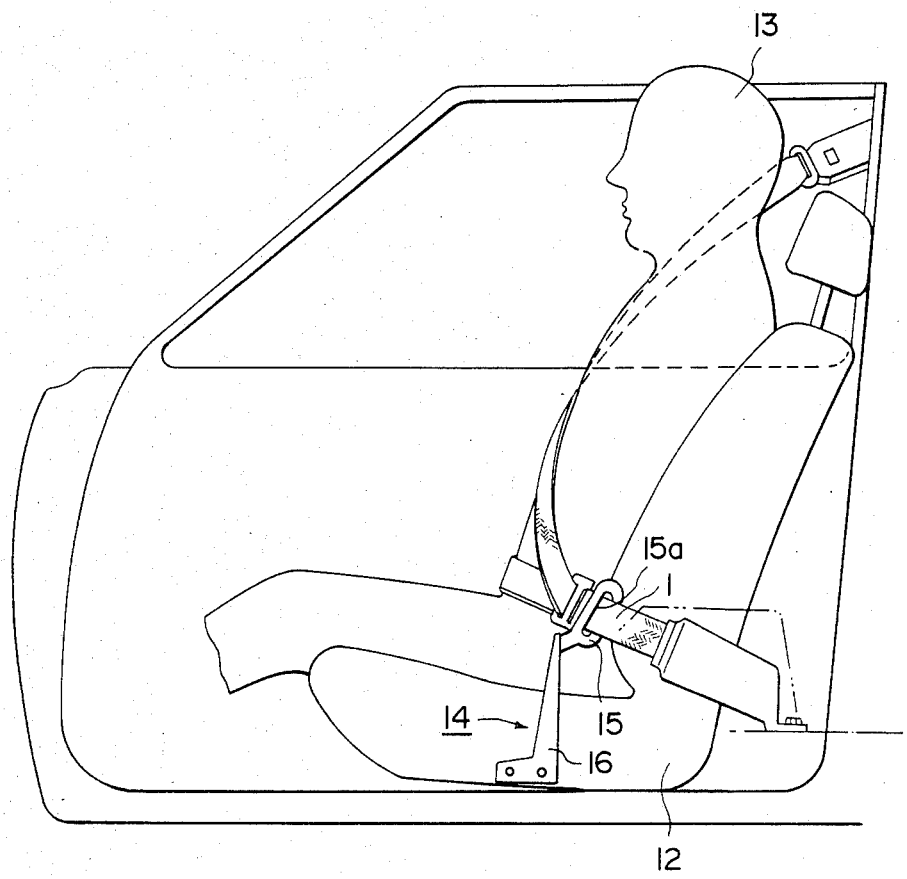
FIG. 4 is a side view showing another conventional automatic seatbelt system.

Detailed description will hereunder be given of the present invention with reference to an embodiment shown in the drawings.

Figure 5:
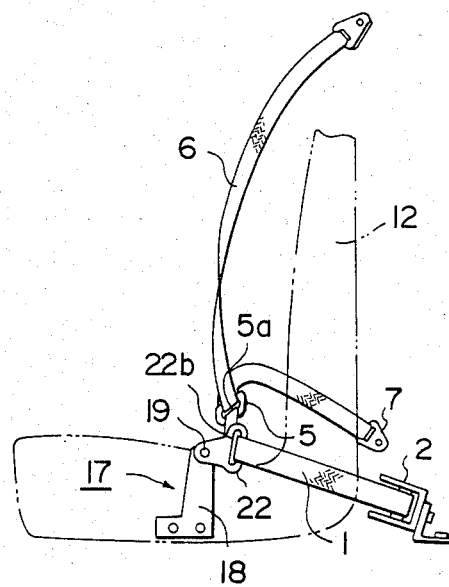
FIG. 5 is a side view showing an embodiment of an automatic seatbelt system according to the present invention, especially without an occupant on a seat.
Figure 6:
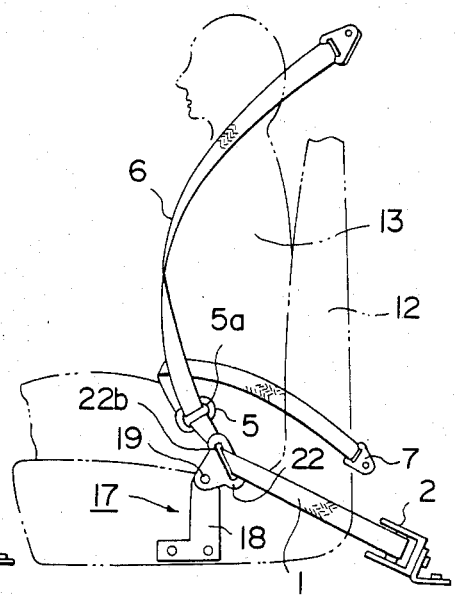
FIG. 6 is the same view as in FIG. 5 with an occupant on a seat.

FIGS. 5 and 6 show one embodiment of the automatic seatbelt system according to the present invention and FIG. 5 is a side view where no occupant is present, while FIG. 6 is a side view where the occupant is present. Same reference numerals as shown in FIGS. 1 through 4 are used in FIGS. 5 and 6 to designate same or similar parts. In the automatic seatbelt system in this embodiment, one end portion of the inner webbing 1 is engaged with substantially the central portion of the vehicle by means of the retractor 2, and a ring joint 5 is secured to the forward end portion of the inner webbing 1. The intermediate portion of the outer webbing 6 is inserted through this ring joint 5, and the opposite and end portions of the outer webbing 6 are secured to the vehicle door 8 (not shown in FIGS. 5 and 6), whereby when the occupant opens or closes the door 8, both webbings 1 and 6 are moved in the longitudinal direction of the vehicle, so that the webbings can be automatically fastened about or unfastened from the occupant. The above-described arrangement is identical with the arrangement of the prior art, so that more detailed description will be omitted.

Figure 7:
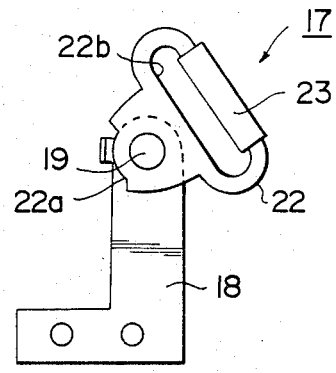
FIG. 7 is a side view showing a guide lever according to the present invention.
Figure 8:
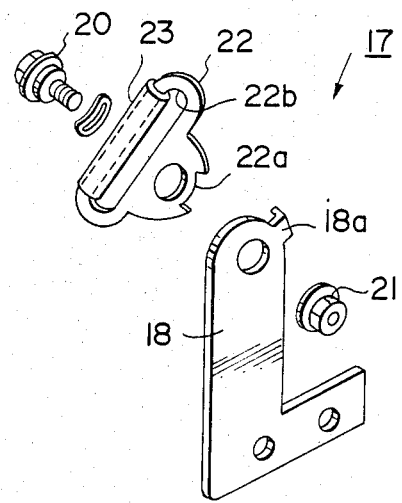
FIG. 8 is an enlarged disassembled perspective view showing the guide lever.

This embodiment features that a guide lever designated at 17 is provided at the inboard side surface of the occupant's seat 12. More specifically, as shown in FIGS. 7 and 8 in detail, the guide lever 17 comprises: a main body 18 of the guide lever solidly secured to the side surface and provided at the top thereof with a hook-shaped projection 18a; and a webbing guide portion 22 rotatably supported at the top of the main body 18 of the guide lever through a rotary pivot 19 including a bolt 20, a nut 21 and the like in this embodiment. The webbing guide portion 22 has a cut-away portion 22a provided in opposed relation to the aforesaid projection l18a. Here, the aforesaid rotary pivot 19 has an axis disposed laterally of the vehicle, and hence, when the webbing guide portion 22 rotates about this rotary pivot 19, the guide loop portion 22b guiding the inner webbing 1 moves substantially in the longitudinal direction of the vehicle with changing the relative angle of an opening defined by the guide loop portion 22b to accord with the movement of the inner webbing 1 because of the occupant on the seat. Additionally, the opposite end portions of the cut-away portion 22a of the webbing guide portion 22 come into abutting contact with the aforesaid projection 18a to control and restrict the rotatable angle of the webbing guide portion 22. To further improve the guiding of the inner webbing 1 by the guide lever 17, a roller 23 may be rotatably mounted on the aforesaid webbing guide portion 22 to reduce friction between the webbing and guide loop portion.

Description will now be given of action of the automatically fastening seatbelt system with the above-described arrangement. When the occupant 13 opens the vehicle door 8 to enter the vehicle, the outer webbing 6 is moved forward in the vehicle in accordance with the circularly arcuate opening motion of the door, whereby the inner webbing 1 is withdrawn from the retractor 2 to form a space for allowing the occupant 13 to enter the vehicle. When the occupant 13 closes the door upon being seated on the seat 12, the outer webbing 6 is moved rearward in the vehicle and an excessive portion of the inner webbing 1 is wound into the retractor 2, so that the webbing can be fastened about the occupant 13.

The webbing guide portion 22 of the guide lever 17 rotates around the pivot 19 on the main body 18 of the guide lever in accordance with the movement of the inner webbing 1 depending upon the absence or presence of the occupant 13 on the seat as shown in FIGS. 5 and 6, the inner webbing 1 is, at any instant freely movable through the guide loop portion 22b, so that the offset portion in the inner webbing as in the prior art is reliably prevented.

As mentioned above referring to FIGS. 1 and 2, a portion of the outer webbing 6 between the ring joint 5 and the buckle device 10 (FIGS. 1 and 2) functions as a shoulder restraining belt for the occupant 13, and another portion of the outer webbing 6 between the ring joint 5 and the anchor plate 7 functions as a lap restraining belt, and the ring joint 5 is movable along the longitudinal direction of the webbing 6. Therefore, the lengths of both restraining portions are accommodated to the physical build, the posture of the occupant in the vehicle or the position of the seat such that one of the restraining belts is passed through the opening 5a of the ring joint 5 to move to the other side, so that the webbing can be properly fastened about the occupant 13.

Furthermore, during normal running condition of the vehicle, the inner webbing 1 can be unwound from the retractor 2 to allow the occupant 13 to change his driving posture. In this case also, the ring joint 5 can move in the longitudinal direction of the outer webbing 6, whereby the occupant 13 is not disturbed in freely changing his driving posture.

Figure 9:
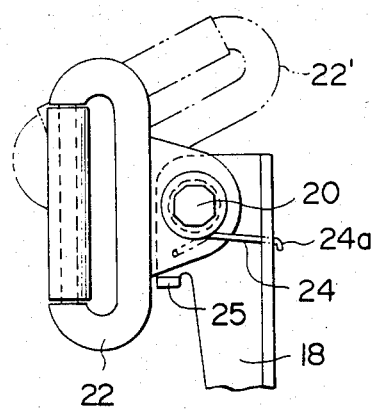
FIG. 9 is an enlarged side view showing a guide lever according to another embodiment of the present invention.
Figure 10:
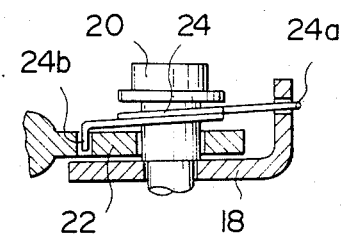
FIG. 10 is a cross-sectional view of the guide lever in FIG. 9.

FIGS. 9 and 10 show another embodiment of the automatic seatbelt system, in which a spring member 24 is wound around the bolt 20, one end portion 24a of the spring member 24 is engaged with the main body 18 of the guide lever and the other end portion 24b is engaged with the webbing guide 22, whereby the webbing guide portion 22 is rotatably biased in a direction that the webbing guide portion 22 is inclined as indicated by solid lines in FIG. 9 during normal condition. Designated at 25 is a stopper provided on the main body 18 of the guide lever and restricts further downward rotation of the webbing guide portion 22. With the above-described arrangement, the same advantages as in the preceding embodiment are obtainable, and moreover, the webbing guide portion 22 can be always positioned in its inclination position as indicated by solid lines in FIGS. 5 and 9 when the occupant is absent, thereby preventing the offset portion in the inner webbing 1 more reliably when the occupant is absent. A webbing guide portion 22' indicated by two-dot chain lines in FIG. 9 shows a slightly inclined state of the webbing guide portion when the occupant is present.

What is claimed is:

1. An automatic seatbelt system for use in a motor vehicle, comprising:
   a webbing, one end of which is secured to an upper rear end of a vehicle door and the other end of which is secured to a central portion of a vehicle floor, whereby said webbing is automatically fastened over and unfastened from an occupant on a vehicle seat in accordance with closing and opening of said door, respectively;
   a guide lever for guiding said webbing at the inner side of said seat, said guide lever comprising:
   a main body mounted on the inner side of said seat and having a first stopper means;
   a webbing guide portion with an opening thorugh which said webbing is passed, said webbing guide portion being rotatably supported on said main body through a laterally extending axis, said webbing guide portion having a second stopper means for restricting a rotational angle of said webbing guide portion within a predetermined angle in cooperation with said first stopper means;
   a spring having one end portion mounted on one of said main body and said webbing guide portion and an opposite end portion urged against the other of said main body portion and said webbing guide portion, said spring biasing said webbing guide portion to urge said second stopper means in a direction toward engagement with said first stopper means; and
   a roller rotatably mounted on said webbing guide portion, an outer periphery of said roller defining said opening through which said webbing is passed.

2. An automatic seatbelt system as set forth in claim 1, wherein said first stopper means comprises a projection on said main body and said second stopper means comprises a cutaway edge portion of said webbing guide portion opposed to said projection.

3. An automatic seatbelt system as set forth in claim 2, wherein said cutaway edge portion defines an angular range of said predetermined angle.

4. An automatic seatbelt system as set forth in claim 2, wherein said spring urges said webbing guide portion in a rearward direction of said vehicle.

5. An automatic seatbelt system as set forth in claim 1, wherein said webbing guide portion defines an elongated opening, said opening being bounded by pairs of first and second sides of said webbing guide portion, said pair of first sides having a length greater than that of said pair of second sides.

6. An automatic seatbelt system as set forth in claim 5, wherein said roller surrounds one of said pair of first sides of said webbing guide portion.

* * * * *